United States Patent
Ohkita (10) Patent No.: US 8,064,831 B2
(45) Date of Patent: Nov. 22, 2011

(54) ELECTRONIC APPARATUS AND COMMUNICATION STATE NOTIFICATION FUNCTION CONTROL METHOD

(75) Inventor: Hideki Ohkita, Kunitachi (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 49 days.

(21) Appl. No.: 12/632,709

(22) Filed: Dec. 7, 2009

(65) Prior Publication Data

US 2010/0184375 A1    Jul. 22, 2010

(30) Foreign Application Priority Data

Jan. 16, 2009  (JP) ................. 2009-008195

(51) Int. Cl.
*H04B 7/00*  (2006.01)
(52) U.S. Cl. ...... 455/41.2; 455/421; 455/41.1; 455/41.3
(58) Field of Classification Search ............ 455/41.1, 455/41.2, 41.3, 421
See application file for complete search history.

(56) References Cited

U.S. PATENT DOCUMENTS

| | | | |
|---|---|---|---|
| 7,209,410 | B2 | 4/2007 | Yamanushi et al. |
| 2003/0146977 | A1* | 8/2003 | Vale et al. .................. 348/207.1 |
| 2004/0042350 | A1 | 3/2004 | Yamanushi |
| 2004/0042413 | A1 | 3/2004 | Kawamura et al. |
| 2007/0041426 | A1 | 2/2007 | Hashimoto |
| 2007/0053412 | A1 | 3/2007 | Hashimoto et al. |
| 2009/0143056 | A1* | 6/2009 | Tang et al. .................... 455/418 |
| 2009/0280860 | A1* | 11/2009 | Dahlke ....................... 455/556.1 |

FOREIGN PATENT DOCUMENTS

| | | |
|---|---|---|
| JP | 2004-022139 | 1/2004 |
| JP | 2007-013705 | 1/2007 |
| JP | 2007-082194 | 3/2007 |
| JP | 2008-211576 | 9/2008 |
| WO | WO 03-013068 | 2/2003 |

OTHER PUBLICATIONS

Notice of Reasons for Rejection mailed by JPO on Mar. 2, 2010 in the corresponding Japanese patent application No. 2009-008195.
Information Sheet for preparing an Information Disclosure Statement.

* cited by examiner

*Primary Examiner* — Tuan Pham
(74) *Attorney, Agent, or Firm* — Knobbe, Martens, Olson & Bear LLP (57) ABSTRACT

According to one embodiment, an electronic apparatus includes a communication module, a communication state notification module, a notification function information obtaining module, and a notification function control module. The communication module executes close proximity wireless transfer. The communication state notification module notifies at least one of a start time and an end time of data transfer executed between the communication module and an external device, the data transfer being executed by the close proximity wireless transfer. The notification function information obtaining module obtains notification function information indicative of a capability relating to a communication state notification function of the external device from the external device. The notification function control module requests the external device to execute or suppress the communication state notification function by the external device, based on the obtained notification function information.

7 Claims, 8 Drawing Sheets

ELECTRONIC APPARATUS AND COMMUNICATION STATE NOTIFICATION FUNCTION CONTROL METHOD

CROSS-REFERENCE TO RELATED APPLICATIONS

This application is based upon and claims the benefit of priority from Japanese Patent Application No. 2009-008195, filed Jan. 16, 2009, the entire contents of which are incorporated herein by reference.

BACKGROUND

1. Field

One embodiment of the invention relates to an electronic apparatus which executes close proximity wireless transfer, and a communication state notification function control method applied to the electronic apparatus.

2. Description of the Related Art

In recent years, wireless communication such as NFC (Near Field Communication) has begun to be used in IC cards, mobile phones, etc. A user can easily execute communication for an authentication process, a billing and settlement process, etc., simply by performing an operation of holding the IC card or mobile phone over a reader/writer module of a host apparatus.

Recently, a new close proximity wireless transfer technology which enables communication at higher speed has begun to be developed. This new close proximity wireless transfer technology realizes not only providing authentication and billing and settlement services but also exchanging data files including text data, video data and audio data between devices simply by bringing the devices close to each other.

The time required for wireless communication for authentication services, etc. is only a moment (e.g. several seconds at most). However, when transferring data such as a large-capacity file by close proximity wireless transfer, the time required for wireless communication becomes relatively long. For example, depending on the data size of a data file, a communication time of several-ten seconds or several minutes may be required to transfer the data file.

Jpn. Pat. Appln. KOKAI Publication No. 2004-22139 discloses an electronic apparatus set in which the playback of content by a first electronic apparatus is stopped and the playback of the content by a second electronic apparatus is started when the first electronic apparatus such as a portable audio player is brought close to the second electronic apparatus such as a stationary player. If a user comes close to the second electronic apparatus while the user is viewing/listening to content by the first electronic apparatus, the playback of the content is automatically switched from the first electronic apparatus to the second electronic apparatus, and the user can continue to view/listen to the content without performing a time-consuming operation.

In the meantime, in the close proximity wireless transfer, it is necessary that the devices be kept in a close proximity state during communication. If the user erroneously moves the device apart during communication such as content data transfer, the connection between the devices is released, and the transfer fails. In order to prevent an erroneous operation by the user during communication, it is necessary to provide the devices with a function of notifying the user of the state of communication or switching of communication.

However, as described above, since the close proximity wireless transfer is executed in the close proximity state of devices, notification outputs from both devices overlap if both devices respectively notify the user of the communication state. Owing to the overlap of notification outputs, it is possible that the user cannot correctly be notified of the communication state. It is necessary, therefore, to realize novel function for adjusting the communication state notification function between the devices.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

DETAILED DESCRIPTION

Various embodiments according to the invention will be described hereinafter with reference to the accompanying drawings. In general, according to one embodiment of the invention, there is provided an electronic apparatus comprising: a communication module configured to execute close proximity wireless transfer; a communication state notification module configured to notify at least one of a start time and an end time of data transfer executed between the communication module and an external device, the data transfer being executed by the close proximity wireless transfer; a notification function information obtaining module configured to obtain notification function information indicative of a capability relating to a communication state notification function of the external device from the external device; and a notification function control module configured to request the external device to execute or suppress the communication state notification function by the external device, based on the obtained notification function information.

Figure 1:
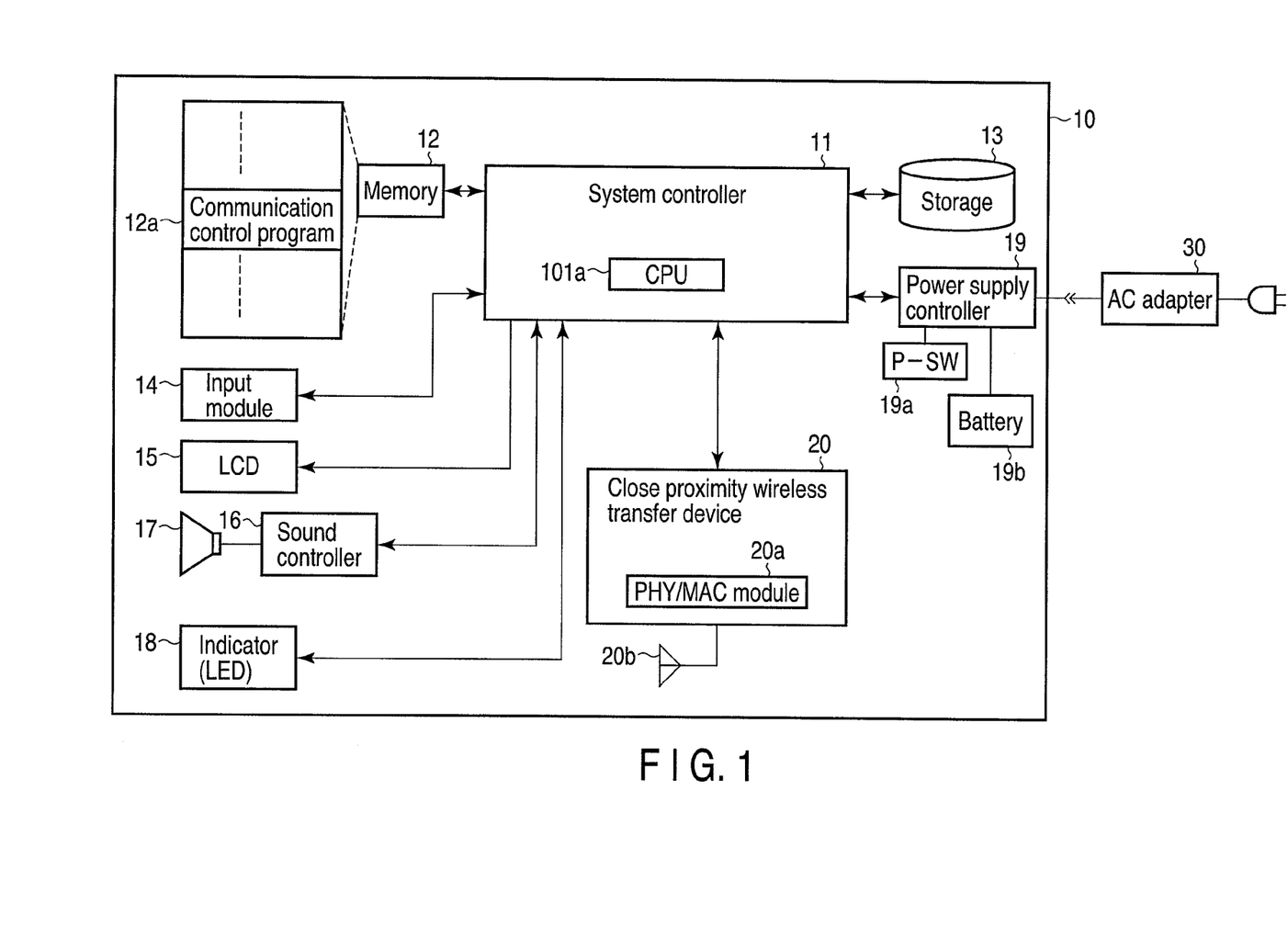
FIG. 1 is an exemplary block diagram showing the system configuration of an electronic apparatus according to an embodiment of the present invention.

FIG. 1 shows the structure of an electronic apparatus according to an embodiment of the present invention. The electronic apparatus 10 is realized, for example, as a portable apparatus (e.g. a mobile phone, a PDA, or an audio player), a personal computer, or a consumer apparatus (e.g. a TV or a video recorder). The electronic apparatus 10 includes a system controller 11, a memory 12, a storage device 13, an input module 14, a liquid crystal display device (LCD) 15, a sound controller 16, a speaker 17, an indicator 18, a power supply controller 19, and a close proximity wireless transfer device 20.

The system controller 11 controls the operations of the respective components in the electronic apparatus 10. The system controller 11 is connected to the memory 12, storage device 13, input module 14, LCD 15, sound controller 16, indicator 18, power supply controller 19, and close proximity wireless transfer device 20. The system controller 11 includes a CPU 101a.

The CPU 101a is a processor which executes an operating system and various application programs/utility programs, which are loaded in the memory 12 from the storage device 13. The application programs/utility programs include a communication control program 12a for controlling the communication operation of the close proximity wireless transfer device 20. The communication control program 12a has a communication state notification function for presenting the state of close proximity wireless transfer executed by the close proximity wireless transfer device 20 (e.g. the start time of data transfer, the end time of data transfer, and the transmission rate of data) by means of sound or light to a user.

The storage device 13 includes, for example, a hard disk drive or a nonvolatile semiconductor memory. The input module 14 is an input device for inputting data and instructions, which are to be delivered to the CPU 101A. The input module 14 is realized by, e.g. a keyboard, button switches, or a pointing device.

The LCD 15 is a display device used as a display monitor of the electronic apparatus 10. The sound controller 16 is a sound source circuit for reproducing sound corresponding to audio data sent from the CPU 101a. The sound controller 16 converts the audio data from a digital audio signal to an analog audio signal, and outputs the analog audio signal to the speaker 17. The speaker 17 reproduces sound corresponding to the analog audio signal.

The indicator 18 presents the state of close proximity wireless transfer executed by the close proximity wireless transfer device 20. The indicator 18 includes a light-emitting module such as an LED.

The power supply controller 19 uses power supplied from the outside via an AC adapter 30 or power supplied from a battery 19b in the electronic apparatus 10, thereby supplying power to the respective components in the electronic apparatus 10. In other words, the electronic apparatus 10 is driven by an external power supply such as an AC commercial power supply, or by the battery 19b. The AC adapter 30 may be provided within the electronic apparatus 10. The power supply controller 19 powers on/off the electronic apparatus 10 in accordance with a user's operation of a power switch (P-SW) 19a.

The close proximity wireless transfer device 20 is a communication module which executes close proximity wireless transfer. The close proximity wireless transfer device 20 establishes wireless connection with other device (external device) having a close proximity wireless transfer function, which is present within a predetermined distance from the close proximity wireless transfer device 20, and starts transmission or reception of data such as files. The close proximity wireless transfer between the close proximity wireless transfer device 20 and the external device is executed in a peer-to-peer mode. The range of communication is, e.g. 3 cm. The wireless connection between the close proximity wireless transfer device 20 and the external device is enabled only if the close proximity wireless transfer device 20 and the external device are in close proximity within the range of communication (e.g. 3 cm). When the close proximity wireless transfer device 20 and the external device are brought close to each other within the range of communication, the wireless connection between the close proximity wireless transfer device 20 and the external device is established. Then, transmission or reception of data, such as a data file explicitly designated by the user, or a predetermined data file which is to be synchronized, is executed between the close proximity wireless transfer device 20 and the external device.

In the close proximity wireless transfer, an induction electric field is used. As a close proximity wireless transfer method, TransferJet, for instance, can be used. TransferJet is a close proximity wireless transfer method using UWB, and realizes high-speed data transfer.

The close proximity wireless transfer device 20 includes a PHY/MAC module 20a and an antenna 20b. The PHY/MAC module 20a is controlled by the communication control program 12a executed by the CPU 101a. The PHY/MAC module 20a executes communication with the external device via the antenna 20b. The antenna 20b is an electrode called "coupler". The antenna 20b executes data transmission/reception to/from the external device by a wireless signal using an induction electric field. If the external device is brought within the range of communication (e.g. 3 cm) from the antenna 20b, the antennas (couplers) of the close proximity wireless transfer device 20 and the external device are coupled by the induction electric field, and thereby wireless communication between the close proximity wireless transfer device 20 and the external device is enabled. In the meantime, the close proximity wireless transfer device 20 and the antenna 20b can be realized as a single module.

Figure 2:
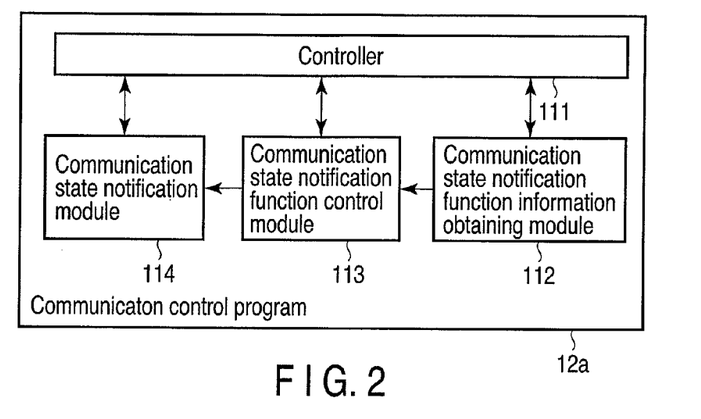
FIG. 2 is an exemplary block diagram showing the structure of a communication control program used in the electronic apparatus of the embodiment.

Next, referring to FIG. 2, the structure of the communication control program 12a is described.

The communication control program 12a includes a control module 111, a communication state notification function information obtaining module 112, a communication state notification function control module 113 and a communication state notification module 114.

The control module 111 controls the communication sequence between the close proximity wireless transfer device 20 and the external device. The wireless communication (close proximity wireless transfer) between the close proximity wireless transfer device 20 and the external device is executed in the order of (1) connection phase, (2) negotiation phase and (3) data transfer phase.

In the connection phase, a connection request signal and a response signal to the connection request signal are transmitted/received between the close proximity wireless transfer device 20 and the external device. Specifically, in the close proximity wireless transfer, one of two devices sends a connection request signal. The other device executes a process of detecting the connection request signal at regular intervals. When the other device has detected the connection request signal from the one device, wireless connection between the two devices is established.

In the negotiation phase, for example, information (the data size of a to-be-transferred file, the number of to-be-transferred data files, the kind of a to-be-transferred file) relating to to-be-transferred content data (e.g. a text data file, an image data file, or an audio data file) is exchanged between the devices. In addition, notification function information indicative of the capability relating to the communication state notification function of each device is exchanged between the devices. The notification function information includes information indicative of the presence/absence of the communication state notification function or the capability of the communication state notification function.

In the data transfer phase, to-be-transferred data (content data) is transmitted from a sender device to a destination (receiver) device.

The communication state notification module 114 notifies a communication state relating to close proximity wireless transfer executed between the close proximity wireless transfer device 20 and the external device. Specifically, the communication state notification module 114 notifies the user of the communication state in the data transfer phase. In this case, for example, the communication state notification module 114 causes the speaker 17 to reproduce a start sound indicative of the start time of data transfer, and an end sound indicative of the end time of data transfer. As described above, the time required for data transfer varies according to content which is to be transmitted, and the close proximity wireless transfer device 20 and the external device need to be kept in a close proximity state during the data transfer. Thus, to notify the user of both the start time of data transfer and the end time of data transfer is effective in preventing an erroneous operation by the user during communication. In addition, the communication state notification module 114 indicates the communication state, for example, by lighting or flickering the LED of the indicator 18. For example, the communication state notification module 114 may determine whether the time needed for transmission of content is a threshold value or more. If the time needed for transmission of content is less than the threshold value, the communication state notification module 114 may control to reproduce only one of the start sound and end sound, for instance, only the end sound.

The communication state notification function information obtaining module 112 sends the information relating to the presence/absence and capability of the communication state notification function in the electronic apparatus 10 to the target external device, and obtains the information relating to the presence/absence and capability of the communication state notification function in the target external device from the target external device.

The communication state notification function control module 113 controls the communication state notification functions of the electronic apparatus 10 and the external device by using the information relating to the presence/absence and capability of the communication state notification function in the external device obtained by the communication state notification function information obtaining module 112.

In the close proximity wireless transfer, the electronic apparatus 10 and the external device are kept in a close proximity state during communication. If the user is notified of the communication state by sound or light from both devices in the close proximity state, it is possible that the user is confused and cannot correctly recognize the communication state. In addition, if each of the closely positioned devices individually notifies the user of the communication state, this may lead to a factor causing wasteful power consumption. Thus, the communication state notification function control module 113 controls the communication state notification functions of the electronic apparatus 10 and external device so that the user may be notified of the communication state by only one of the devices. Specifically, the communication state notification function control module 113 executes control to suppress the communication state notification function of the external device if the communication state is notified by the communication state notification function of the electronic apparatus 10, and executes control to suppress the communication state notification function of the electronic apparatus 10 if the communication state is notified by the communication state notification function of the external device.

To be more specific, in order to control the communication state notification function of the external device, the communication state notification function control module 113 issues to the external device a request for execution or suppression of the communication state notification function by the external device, based on the notification function information obtained from the external device. In this case, the communication state notification function control module 113 compares the communication state notification function of the communication state notification module 114 and the communication state notification function of the external device indicated by the notification function information obtained from the external device. Based on the comparison result, the communication state notification function control module 113 sends a signal for requesting the execution or suppression of the communication state notification function to the external device by the close proximity wireless transfer device 20. When the communication state notification function control module 113 has issued a request for execution of the communication state notification function to the external device, the communication state notification function control module 113 suppresses the execution of the communication state notification function by the communication state notification module 114.

Besides, the communication state notification function control module 113 may control only the communication state notification function of the electronic apparatus 10 based on the capability of the external device, without controlling the communication state notification function of the external device. In this case, the communication state notification function control module 113 executes or suppresses the communication state notification function by the communication state notification module 114, based on the notification function information which has been acquired from the external device. For example, if the external device has the communication state notification function or if the communication state notification function of the external device has a higher function level than the communication state notification function of the communication state notification module 114, the communication state notification function control module 113 suppresses the execution of the communication state notification function by the communication state notification module 114.

In FIG. 2, the communication state notification function information obtaining module 112, communication state notification function control module 113 and communication state notification module 114 are depicted as different modules. Alternatively, the communication state notification function information obtaining module 112, communication state notification function control module 113 and communication state notification module 114 may be realized as a single module.

Figure 3:
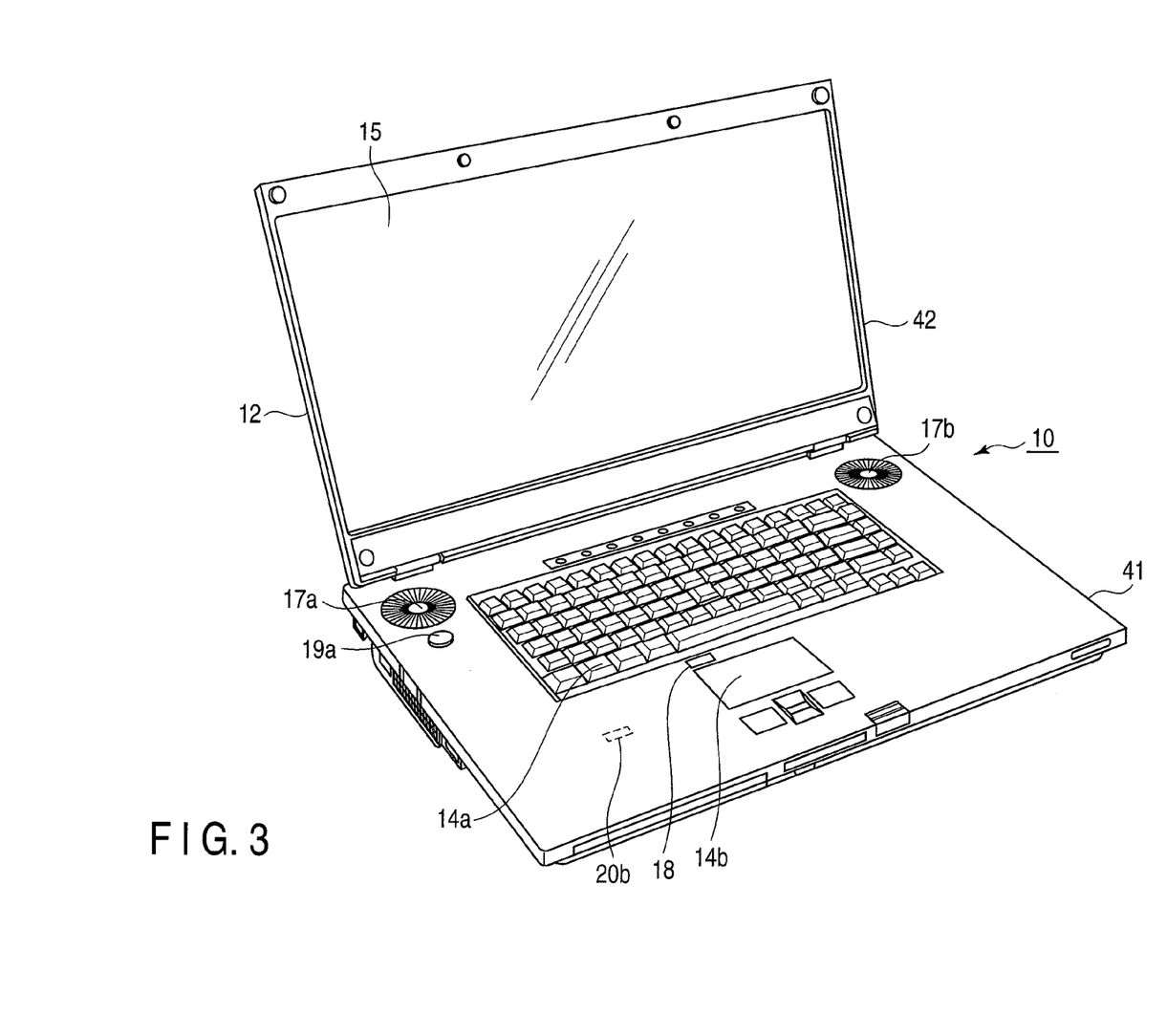
FIG. 3 is an exemplary perspective view showing the external appearance of the electronic apparatus of the embodiment.

Next, referring to FIG. 3, an example of the external appearance of the electronic apparatus 10 is described, assuming that the electronic apparatus 10 is realized as a portable personal computer.

FIG. 3 is a perspective view showing the external appearance of the electronic apparatus 10.

The electronic apparatus 10 comprises a main body 41 and a display unit 42. The display unit 42 is attached to the main body 41 such that the display unit 42 is rotatable between an open position where the top surface of the main body 41 is exposed, and a closed position where the top surface of the main body 41 is covered with the display unit 42. The above-described LCD 15 is provided in the display unit 42.

The main body 41 has a thin box-shaped housing. A keyboard 14a, a touch pad 14b, speakers 17a and 17b, indicator 18 and power switch 19a are disposed on the top surface of the housing of the main body 41.

The top surface of the main body 41, to be more specific, a part of the palm rest area on the top surface of the main body 41, functions as a communication surface. Specifically, the close proximity wireless transfer device 20 and antenna (coupler) 20b are provided within the main body 41 so as to be opposed to the top surface of the main body 41. The antenna (coupler) 20b is disposed so as to output a radio signal (induction electric field) to the outside via the top surface of the main body 41 (specifically, a part of the palm rest area on the top surface of the main body 41). A small area on the top surface of the main body 41 opposed to the antenna (coupler) 20b, that is, a small area on the top surface of the main body 41 located on the upper side of the antenna (coupler) 20b, is used as a communication position. The close proximity wireless transfer device 20 executes close proximity wireless transfer with the external device located within a predetermined range of communication (e.g. 3 cm) from the communication position on the top surface of the main body 41, via the top surface of the main body 41.

The user can start data transfer between the external device and the electronic apparatus 10 by performing, for example, an operation (also referred to as "touch operation") of bringing the external device having the close proximity wireless transfer function over the communication position on the top surface of the main body 41.

Figure 4:
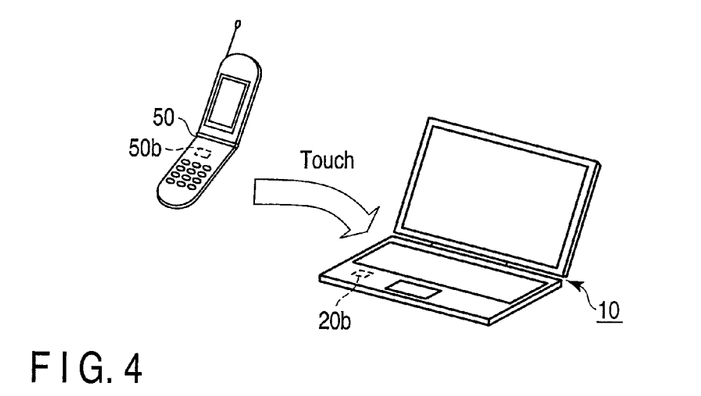
FIG. 4 shows an example of close proximity wireless transfer executed between the electronic apparatus of the embodiment and an external device.

FIG. 4 illustrates close proximity wireless transfer executed between a mobile phone 50 and the electronic apparatus 10. An antenna (coupler) for close proximity wireless transfer is provided within the housing of the mobile phone 50 so as to be opposed to the back surface of the housing. In this case, data transfer between the mobile phone 50 and electronic apparatus 10 can be started by bringing the back surface of the housing of the mobile phone 50 over the communication position on the top surface of the main body 41.

Figure 5:
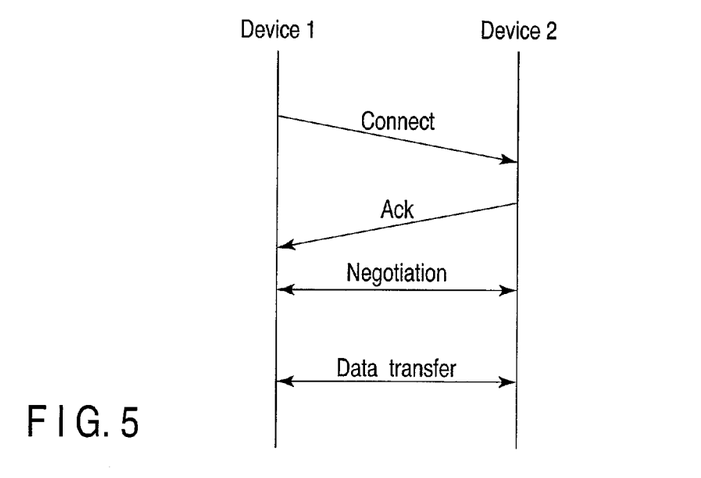
FIG. 5 shows an exemplary communication sequence executed between the electronic apparatus of the embodiment and the external device.

Next, referring to FIG. 5, a description is given of the communication sequence executed between the mobile phone 50 and electronic apparatus 10.

It is assumed that close proximity wireless transfer is executed between a device 1 and a device 2. Of the devices 1 and 2, the device which is to start communication, for instance, the device 1, transmits a connection request signal (Connect). This connection request signal may include a device ID of the device 1 (e.g. a device ID of a close proximity wireless transfer device in the device 1). The device 2 periodically executes a process of detecting the connection request signal. When the device 1 and device 2 are brought close to each other, the device 2 can detect the connection request signal transmitted from the device 1. When the device 2 has detected the connection request signal, the device 2 transmits a response signal (Ack) to the connection request signal to the device 1. The response signal (Ack) may include a device ID of the device 2 (e.g. a device ID of a close proximity wireless transfer device provided in the device 2). The device 1 can detect the response signal (Ack) transmitted from the device 2. In this manner, wireless connection is established between the device 1 and device 2 by transmitting/receiving the connection request signal/response signal between the device 1 and device 2.

Subsequently, a negotiation process is executed between the device 1 and device 2. In the negotiation process, information relating to to-be-transferred content is exchanged between the device 1 and device 2. Then, data transfer is started between the device 1 and device 2.

The electronic apparatus 10 may function as either the device 1 or the device 2.

Figure 6:
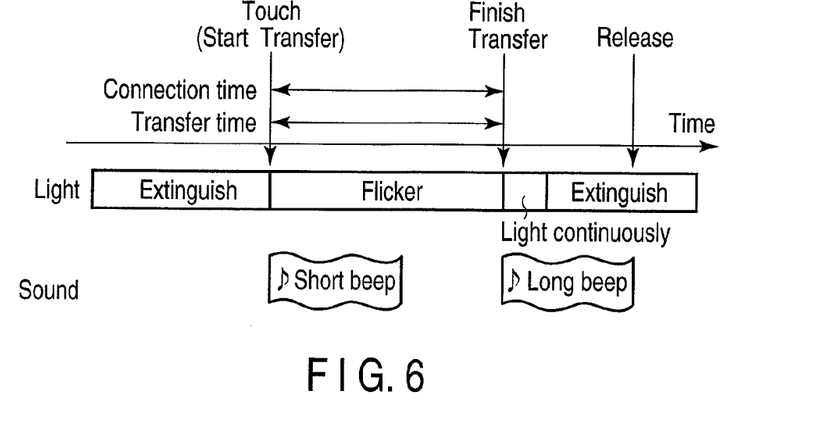
FIG. 6 shows an example of a communication state notification by a communication state notification module in the electronic apparatus of the embodiment.

Next, referring to FIG. 6, a description is given of an example of the communication state notified by the communication state notification module 114 in the electronic apparatus 10.

If the electronic apparatus 10 and external device are brought close to each other by the user's touch operation, connection between the electronic apparatus 10 and external device is established, and transfer (transmission or reception) of content data is enabled. At the same time as the start time of transfer of content data, the communication state notification module 114 causes the LED of the indicator 18 to flicker, and causes the speaker 17 to reproduce a start sound, thereby notifying the user of the start time of transfer. While the content data is being transferred, the communication state notification module 114 causes the LED of the indicator 18 to flicker. If the transfer of the content data is finished, the communication state notification module 114 lights the LED of the indicator 18 continuously for a predetermined time period, and then turns off the LED, and also causes the speaker 17 to reproduce an end sound indicative of the end time of transfer. Thereby, the user can be notified of the end time of transfer of content data. Since different melodies are used for the start sound and the end sound, the user can discriminate the start time and end time of transfer by the sound alone. If the user confirms the end time of transfer and separates the electronic apparatus 10 and external device more than the predetermined range (3 cm), the connection between the devices is released.

In this manner, the communication state notification module 114 can notify the user of the start time of transfer of content data, the continuation of transfer of the content data and the end time of transfer of the content data, by the light and flicker of the LED of the indicator 18 and the melody reproduced from the speaker 17.

Figure 7:
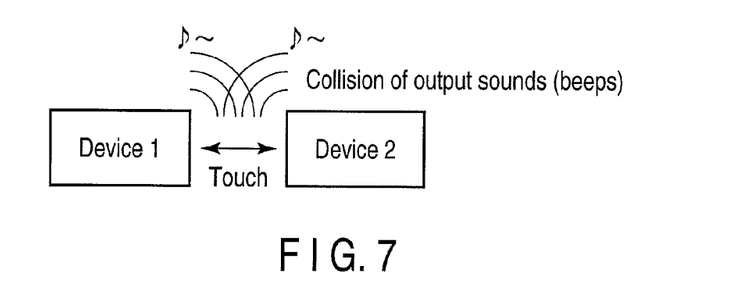
FIG. 7 shows an example of overlap of audio outputs by the electronic apparatus of the embodiment and the external device.

FIG. 7 shows an example of overlap of audio outputs notifying the communication state by the electronic apparatus 10 and the external device.

In FIG. 7, each of the device 1 that is the electronic apparatus 10 and the device 2 that is the external device has an audio output function. If the user performs the touch operation of bringing the device 2 close to the device 1, connection of wireless communication between the device 1 and device 2 is established. When data transfer is started between the devices, each of the device 1 and device 2 reproduces a start sound indicative of the start time of transfer.

Since the start sound reproduced by the device 1 and the start sound reproduced by the device 2 are reproduced almost at the same time, it is possible that the user may be confused or the user may feel unpleasant cacophony. Thus, in the present embodiment, to enable the audio output function of one of the electronic apparatus 10 and the external device and to disable the audio output function of the other of the electronic apparatus 10 and the external device are controlled. By notifying the communication state by using the audio output function of either the electronic apparatus 10 or the external device, the user can easily discriminate the communication state.

Figure 8:
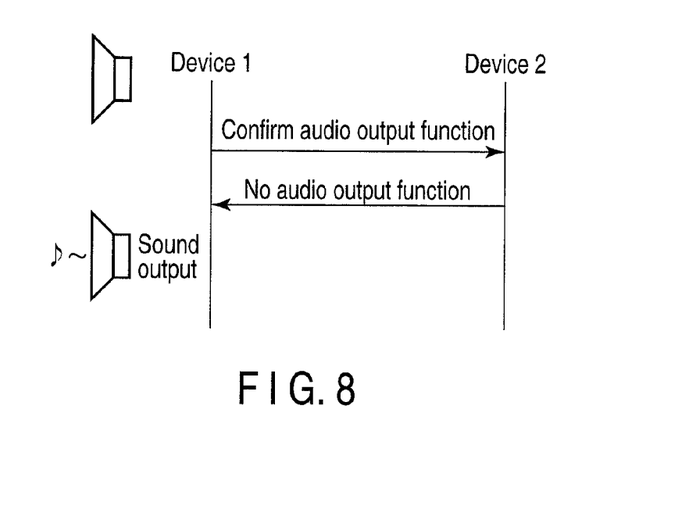
FIG. 8 shows an example of an audio output function control by the electronic apparatus of the embodiment and the external device.

Next, referring to FIG. 8, a description is given of an example of controlling the audio output function between the electronic apparatus 10 and the external device. It is assumed that the device 1 has the audio output function and the device 2 does not have the audio output function. The device 1 is, for example, a device (master) which controls communication between the devices 1 and 2. The device which has output a connection request signal may become a master.

To start with, in order to confirm the audio output function of the device 2, the device 1 requests the device 2 to transmit information relating to the audio output function in the negotiation phase. Responding to this request, the device 2 transmits the information indicating that the device 2 does not have the audio output function to the device 1. The device 1 controls to perform the audio output by the device 1 since the device 2 does not have the audio output function. Thus, the device 1 outputs sound indicative of the communication state when data is transmitted between the device 1 and device 2.

Figure 9:
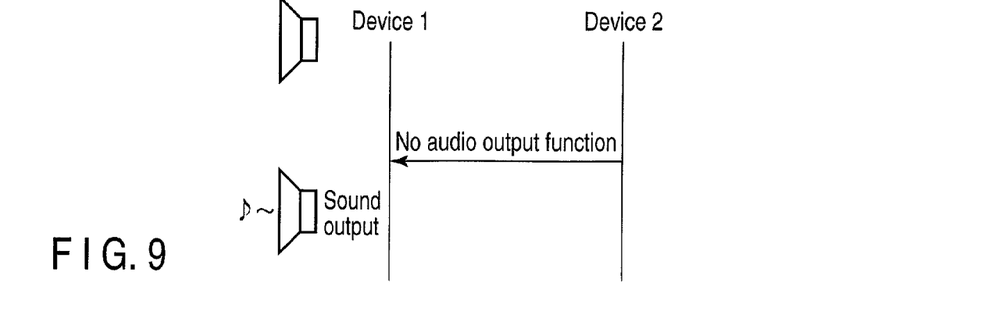
FIG. 9 shows another example of the audio output function control by the electronic apparatus of the embodiment and the external device.

FIG. 9 shows another example of controlling the audio output function between the electronic apparatus 10 and the external device. It is assumed that the device 1 has the audio output function and the device 2 does not have the audio output function. In this example, the device 2 is a device (master) which controls communication between the devices 1 and 2.

To start with, the device 2 transmits the information indicating that the device 2 does not have the audio output function to the device 1 in the negotiation phase. The device 1 controls to perform the audio output by the device 1 since the device 2 does not have the audio output function. Thus, the device 1 outputs sound indicative of the communication state when data is transmitted between the device 1 and device 2.

Figure 10:
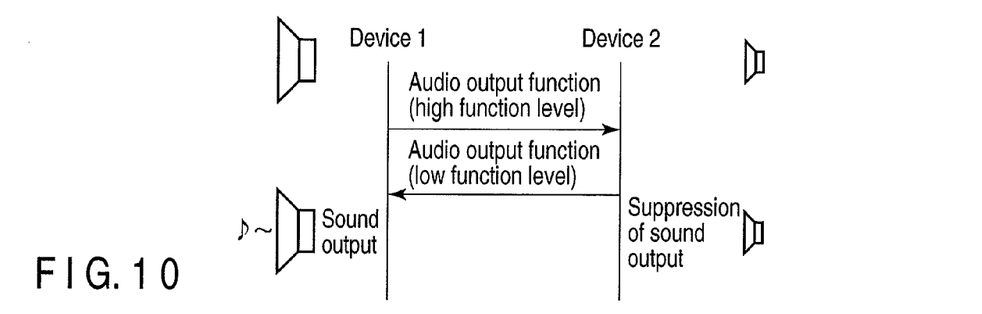
FIG. 10 shows still another example of the audio output function control by the electronic apparatus of the embodiment and the external device.

FIG. 10 shows still another example of controlling the audio output function between the electronic apparatus 10 and the external device. In this example, it is assumed that both the device 1 and device 2 have the audio output functions, and that the audio output function of the device 1 has a higher function level than the audio output function of the device 2. The device 1 is, for example, a device (master) which controls communication between the devices 1 and 2.

To start with, the device 1 transmits information indicative of the capability of the audio output function of the device 1 to the device 2 in the negotiation phase. The device 2 transmits information indicative of the capability of the audio output function of the device 2 to the device 1 in the negotiation phase.

The device 1 compares the capability of the audio output function of the device 1 and the capability of the audio output function of the device 2, and determines that the audio output function of the device 1 has a higher function level than the audio output function of the device 2. Thus, the device 1 outputs sound indicative of the communication state when data is transmitted between the device 1 and device 2.

In addition, the device 2 compares the capability of the audio output function of the device 1 and the capability of the audio output function of the device 2, and determines that the audio output function of the device 2 has a lower function level than the audio output function of the device 1. The device 2 suppresses the audio output function of the device 2. Thus, the device 2 does not output sound indicative of the communication state when data is transmitted between the device 1 and device 2.

In the example of FIG. 10, the device 2 itself suppresses the audio output function. Alternatively, like an example of FIG. 11, the device 1 may issue a request for suppressing the audio output function to the device 2.

Figure 11:
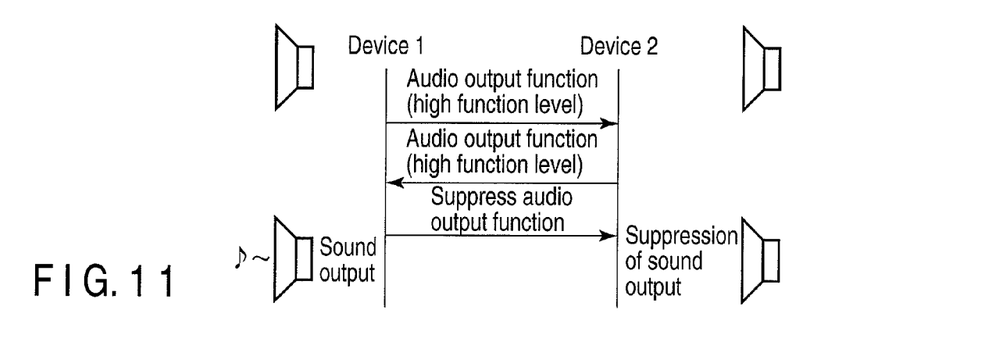
FIG. 11 shows still another example of the audio output function control by the electronic apparatus of the embodiment and the external device.

FIG. 11 shows still another example of controlling the audio output function between the electronic apparatus 10 and the external device. In this example, it is assumed that both the device 1 and device 2 have the audio output functions, and that the audio output function of the device 1 has the same function level as the audio output function of the device 2. The device 1 is, for example, a device (master) which controls communication between the devices 1 and 2.

To start with, the device 1 transmits information indicative of the capability of the audio output function of the device 1 to the device 2 in the negotiation phase. The device 2 transmits information indicative of the capability of the audio output function of the device 2 to the device 1 in the negotiation phase.

The device 1 compares the capability of the audio output function of the device 1 and the capability of the audio output function of the device 2, and determines that the audio output function of the device 1 has the same function level as the audio output function of the device 2. The device 1 sends a request for suppressing the audio output function of the device 2 to the device 2. Upon receiving the request for suppressing the audio output function of the device 2, the device 2 suppresses the audio output function of the device 2. Thus, the device 1 outputs sound indicative of the communication state, and the device 2 does not output sound indicative of the communication state when data is transmitted between the device 1 and device 2.

Figure 12:
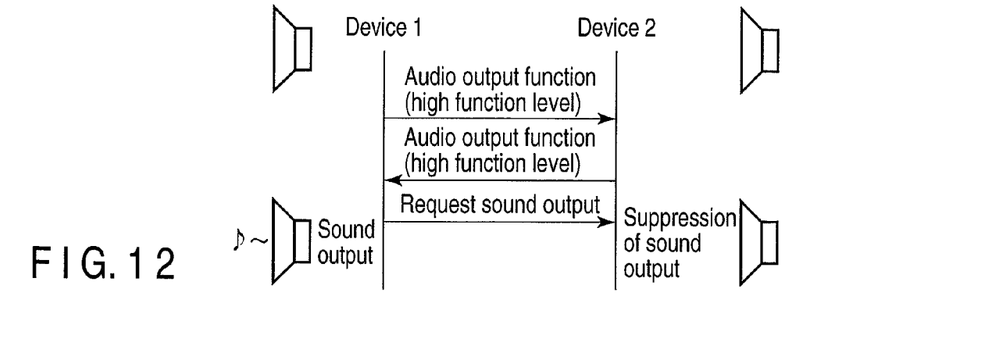
FIG. 12 shows still another example of the audio output function control by the electronic apparatus of the embodiment and the external device.

FIG. 12 shows still another example of controlling the audio output function between the electronic apparatus 10 and the external device. In this example, it is assumed that both the device 1 and device 2 have the audio output functions, and that the audio output function of the device 1 has the same function level as the audio output function of the device 2. The device 2 is, for example, a device (master) which controls communication between the devices 1 and 2.

To start with, the device 2 transmits information indicative of the capability of the audio output function of the device 2 to the device 1 in the negotiation phase. The device 1 transmits information indicative of the capability of the audio output function of the device 1 to the device 2 in the negotiation phase.

The device 2 compares the capability of the audio output function of the device 1 and the capability of the audio output function of the device 2, and determines that the audio output function of the device 1 has the same function level as the audio output function of the device 2. The device 2 sends to the device 1 a request for outputting sound by the device 1. In addition, the device 2 suppresses the audio output function of the device 2. Thus, when data is transmitted between the device 1 and device 2, the device 1 outputs sound indicative of the communication state, and the device 2 does not output sound indicative of the communication state.

As in the examples of FIGS. 11 and 12, there are many possible methods of determining which of two devices is to suppress the audio output if the audio output functions of both devices have the same function level. For example, in one possible method, a data-reception-side device may output sound and a data-transmission-side device may suppress sound output when data transmission is started, and the data-transmission-side device may output sound and the data-reception-side device may suppress sound output when the data reception is finished. Thereby, at the time of the end of data transfer, in particular, the end of data reception can be ensured on the reception side.

As described with reference to FIGS. 8 to 12, when close proximity wireless communication is executed between the electronic apparatus 10 and the external device, control is executed such that the audio output function of one of the electronic apparatus 10 and the external device is enabled, and the audio output function of the other is disabled. In the above description, the audio output function of notifying the communication state of close proximity wireless transfer has been particularly described. However, the above-described control is also applicable to any kind of communication state notification function for notifying the communication state, such as an optical output function for lighting the LED of the indicator 18. Furthermore, the information indicative of the capability of the communication state notification function (the presence/absence of the communication state notification function, the capability of the communication state notification function) may be sent in such a manner that this information is included in a connection request signal or a response signal.

Figure 13:
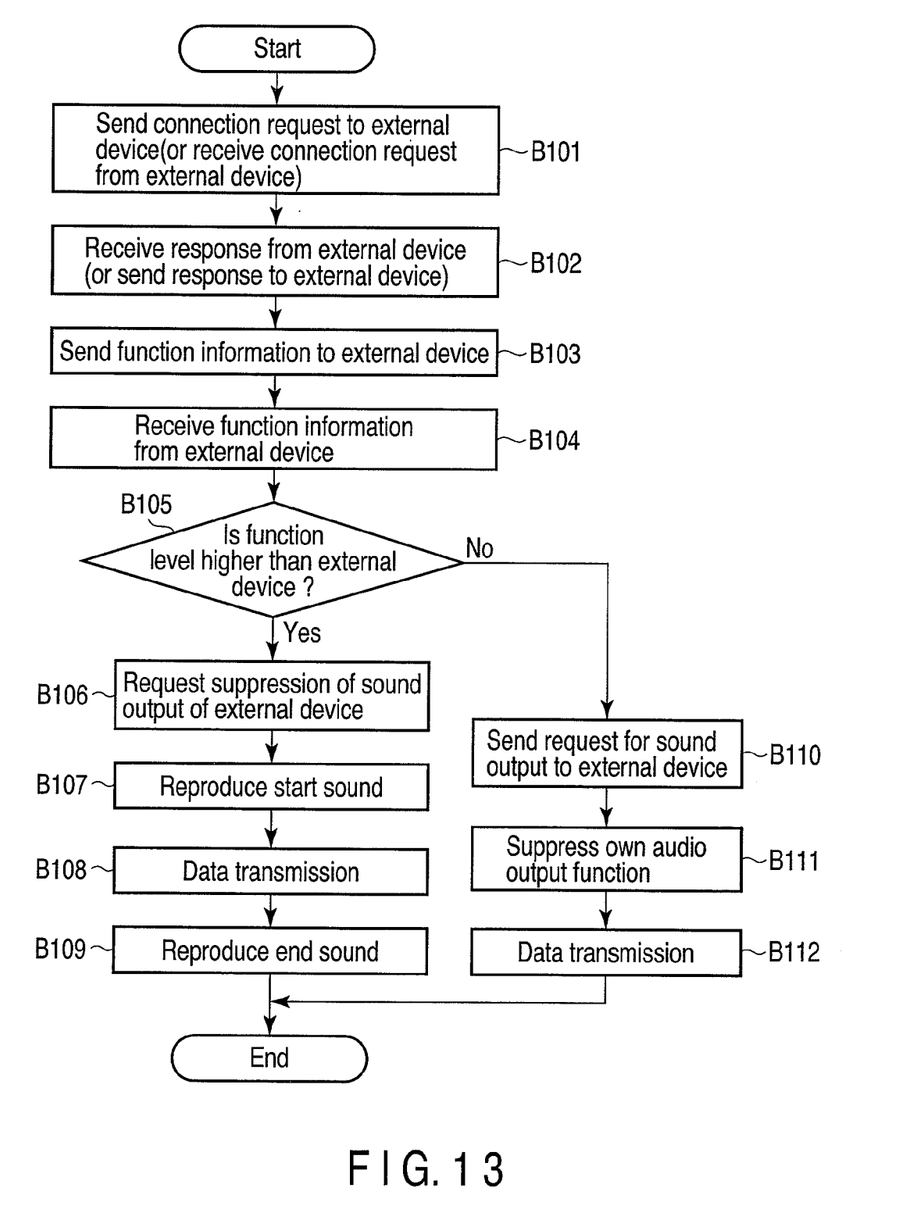
FIG. 13 is an exemplary flowchart illustrating the procedure of a controlling-side communication process executed by the electronic apparatus of the embodiment.

Next, referring to a flowchart of FIG. 13, a description is given of an example of the procedure of a controlling-side communication process executed by the electronic apparatus 10. It is assumed that the electronic apparatus 10 controls the communication state notification functions of the electronic apparatus 10 and the external device.

There are two connection modes of the close proximity communication method, namely an initiator mode and a responder mode. The device set in the initiator mode, that is, the initiator device, functions as a master device and sends a connection request to the other device. The device set in the responder mode, that is, the responder device, functions as a slave device and detects the connection request transmitted from the initiator. When the initiator and responder are brought close to each other, connection between the initiator and responder is established. The communication control program 102a controls the close proximity wireless transfer device 20, and sets the connection mode of the close proximity wireless transfer device 20 to be the initiator mode or the responder mode.

If the close proximity wireless transfer device 20 has been set in the initiator mode, the close proximity wireless transfer device 20 transmits a connection request signal to the external device (block B101). The connection request signal includes the device ID of the close proximity wireless transfer device 20. The close proximity wireless transfer device 20 waits for a response signal from the external device. When the close proximity wireless transfer device 20 receives the response signal from the external device (block B102), wireless connection is established between the close proximity wireless transfer device 20 and the external device.

On the other hand, if the close proximity wireless transfer device 20 has been set in the responder mode, the close proximity wireless transfer device 20 periodically executes a process of detecting a connection request signal from the external device (block B101). The connection request signal includes the device ID of the external device. When the close proximity wireless transfer device 20 receives the connection request signal from the external device, the close proximity wireless transfer device 20 transmits a response signal including the device ID of thereof to the external device (block B102).

Prior to starting data transfer, the communication control program 102a executes a negotiation process with the external device that is the target of communication, and determines content data to be transmitted. In addition, by the negotiation process, the communication control program 102a sends the notification function information indicative of the capability of the communication state notification function which is the function of notifying the communication state to the external device (block B103). Furthermore, by the negotiation process, the communication control program 102a receives the notification function information indicative of the capability of the communication state notification function of the external device from the external device (block B104).

The communication control program 102a determines whether the communication state notification function of the electronic apparatus 10 has a higher function level than the communication state notification function of the external device, using the received notification function information of the external device (block B105).

If the communication state notification function of the electronic apparatus 10 has a higher function level than the communication state notification function of the external device (YES in block B105), the communication control program 102a issues a request for suppressing the audio output function to the external device (block B106). A signal requesting the suppression of the audio output function is sent from the close proximity wireless transfer device 20 to the external device. The external device, which has received the request, suppresses the audio output function of the electronic apparatus 10, and does not output sound indicative of the start time/end time of data transfer between the electronic apparatus 10 and the external device.

On the other hand, the communication control program 102a of the electronic apparatus 10 outputs a start sound indicative of the start time of data transfer, by using the audio output function of the electronic apparatus 10 (block B107). The communication control program 102a transmits the content data determined by the negotiation process (block B108). When the transfer of content data is completed, the communication control program 102a outputs an end sound indicative of the end time of data transfer (block B109).

If the communication state notification function of the electronic apparatus 10 does not have a higher function level than the communication state notification function of the external device, for example, if the communication state notification function of the external device has a higher function level than the communication state notification function of the electronic apparatus 10 (NO in block B105), the communication control program 102a issues a request for sound output to the external device (block B110). A signal requesting the sound output is sent from the close proximity wireless transfer device 20 to the external device. In addition, the communication control program 102a suppresses the audio output function of the electronic apparatus 10 (block B111). Thus, in the electronic apparatus 10, no sound which indicates the start time and end time of data transfer is output.

The communication control program 102a transmits the content data determined by the negotiation process (block B112). When data transfer is started, a start sound indicative of the start time of transfer is reproduced by the external device. In addition, when the data transfer is completed, an end sound indicative of the end time of transfer is reproduced by the external device.

By the above-described process, the electronic apparatus 10 executes control to notify the communication state by that one of the electronic apparatus 10 and external device, which has the communication state notification function of a higher function level. Specifically, if the communication state notification function of the electronic apparatus 10 has a higher function level than the communication state notification function of the external device, the electronic apparatus 10 reproduces the start sound indicative of the start time of data transfer and the end sound indicative of the end time of data transfer, and issues a request for suppressing the audio output function to the external device. On the other hand, if the communication state notification function of the electronic apparatus 10 does not have a higher function level than the communication state notification function of the external device, the electronic apparatus 10 suppresses the audio output function thereof, and issues a request for sound output to the external device.

In the above-described flowchart, mention has been made of only the notification by sound output from the speaker 17. However, the above-described control can be applied to the notification by lighting or flickering of the LED of the indicator 18.

Figure 14:
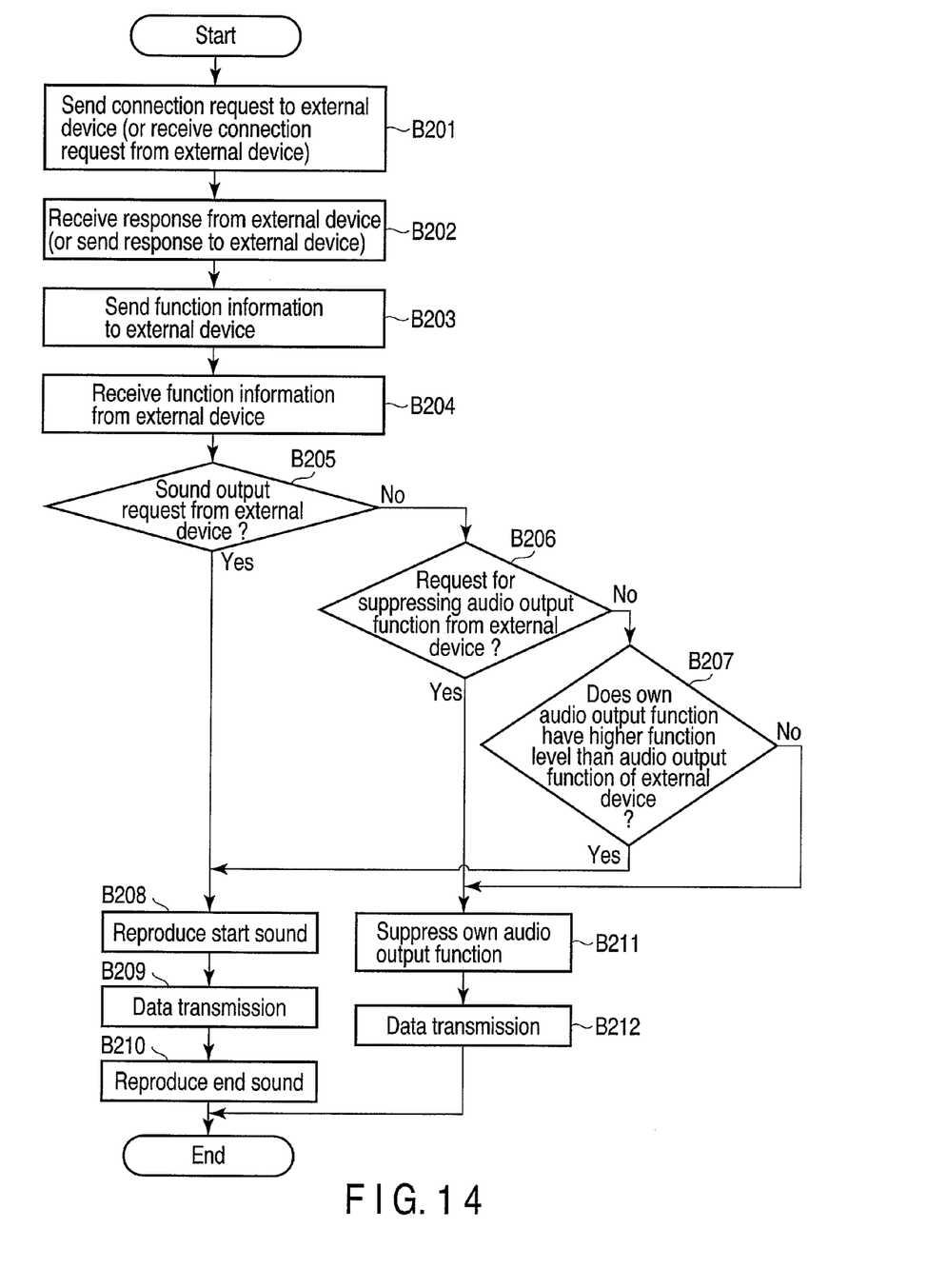
FIG. 14 is an exemplary flowchart illustrating the procedure of a controlled-side communication process executed by the electronic apparatus of the embodiment.

FIG. 14 is a flowchart illustrating an example of the procedure of a controlled-side communication process executed by the electronic apparatus 10. It is assumed that the communication state notification function of the electronic apparatus 10 is controlled by the external device.

As described above, there are two connection modes of the close proximity communication method, namely an initiator mode and a responder mode. If the close proximity wireless transfer device 20 has been set in the initiator mode, the close proximity wireless transfer device 20 transmits a connection request signal to the external device (block B201). The connection request signal includes the device ID of the close proximity wireless transfer device 20. The close proximity wireless transfer device 20 waits for a response signal from the external device. When the close proximity wireless transfer device 20 receives the response signal from the external device (block B202), wireless connection is established between the close proximity wireless transfer device 20 and the external device.

On the other hand, if the close proximity wireless transfer device 20 has been set in the responder mode, the close proximity wireless transfer device 20 periodically executes a process of detecting a connection request signal from the external device (block B201). The connection request signal includes the device ID of the external device. When the close proximity wireless transfer device 20 receives the connection request signal from the external device, the close proximity wireless transfer device 20 transmits a response signal including the device ID of thereof to the external device (block B202).

Prior to starting data transfer, the communication control program 102a executes a negotiation process with the external device that is the target of communication, and determines content data to be transmitted. In addition, by the negotiation process, the communication control program 102a sends the notification function information indicative of the capability of the communication state notification function which is the function of notifying the communication state to the external device (block B203). Furthermore, by the negotiation process, the communication control program 102a receives the notification function information indicative of the capability of the communication state notification function of the external device from the external device (block B204).

The communication control program 102a determines whether a request for sound output has been issued from the external device to the electronic apparatus 10 (block B205).

If the request for sound output has been issued from the external device to the electronic apparatus 10 (YES in block B205), the communication control program 102a reproduces a start sound indicative of the start time of data transfer, by using the audio output function of the electronic apparatus 10 (block B208). The communication control program 102a transmits the content data determined by the negotiation process (block B209). When the transfer of content data is completed, the communication control program 102a outputs an end sound indicative of the end time of data transfer (block B210). In this case, the audio output function of the external device is suppressed, and the external device does not reproduce the start sound indicative of the start time of data transfer or the end sound indicative of the end time of data transfer.

If the request for sound output has not been issued from the external device to the electronic apparatus 10 (NO in block B205), the communication control program 102a determines whether a request for suppressing the audio output function has been issued from the external device to the electronic apparatus 10 (block B206).

If the request for suppressing the audio output function has been issued from the external device to the electronic apparatus 10 (YES in block B206), the communication control program 102a suppresses the audio output function of the electronic apparatus 10 (block B211). Thus, in the electronic apparatus 10, no sound which indicates the start time and end time of data transfer is output. After the audio output function of the electronic apparatus 10 is suppressed, the communication control program 102a transmits the content data determined by the negotiation process (block B212).

If the request for suppressing the audio output function has not been issued from the external device to the electronic apparatus 10 (NO in block B206), the communication control program 102a determines whether the communication state notification function of the electronic apparatus 10 has a higher function level than the communication state notification function of the external device, by using the received notification function information of the external device (block B207).

If the communication state notification function of the electronic apparatus 10 has a higher function level than the communication state notification function of the external device (YES in block B207), the communication control program 102a reproduces the start sound indicative of the start time of data transfer, by using the audio output function of the electronic apparatus 10 (block B208). The communication control program 102a transmits the content data determined by the negotiation process (block B209). When the transfer of content data is completed, the communication control program 102a reproduces the end sound indicative of the end time of data transfer (block B210).

If the communication state notification function of the electronic apparatus 10 does not have a higher function level than the communication state notification function of the external device, for example, if the communication state notification function of the external device has a higher function level than the communication state notification function of the electronic apparatus 10 (NO in block B207), the communication control program 102a suppresses the audio output function of the electronic apparatus 10 (block B211). After the audio output function of the electronic apparatus 10 is suppressed, the communication control program 102a transmits the content data determined by the negotiation process (block B212).

By the above-described process, the electronic apparatus 10 is controlled by the external device, so that the communication state is notified by that one of the electronic apparatus 10 and external device, which has the communication state notification function of a higher function level. Specifically, if the request for sound output is issued from the external device to the electronic apparatus 10, the electronic apparatus 10 reproduces the start sound indicative of the start time of data transfer and the end sound indicative of the end time of data transfer. On the other hand, if the request for suppressing sound output is issued from the external device to the electronic apparatus 10, the electronic apparatus 10 reproduces neither the start sound indicative of the start time of data transfer nor the end sound indicative of the end time of data transfer.

In the above-described flowchart, mention has been made of only the notification by sound output from the speaker 17. However, the above-described control can be applied to the notification by lighting or flickering of the LED of the indicator 18.

Figure 15:
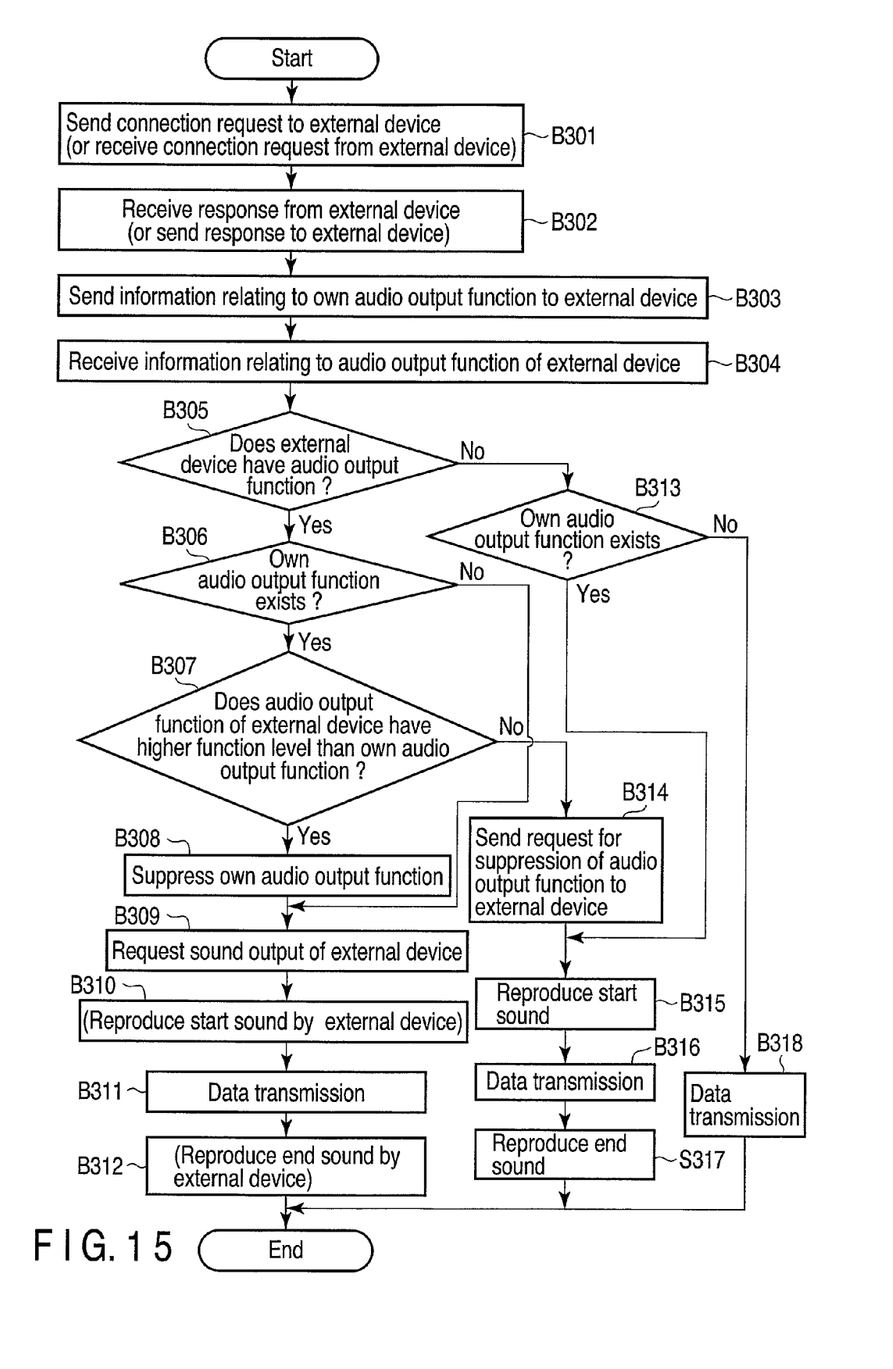
FIG. 15 is an exemplary flowchart illustrating a detailed procedure of the communication process executed by the electronic apparatus of the embodiment.

Next, referring to a flowchart of FIG. 15, a description is given of an example of a detailed procedure of the communication process executed by the electronic apparatus. It is assumed that the electronic apparatus 10 controls the communication state notification functions of the electronic apparatus 10 and the external device.

As mentioned above, there are two connection modes of the close proximity communication method, namely an initiator mode and a responder mode. If the close proximity wireless transfer device 20 has been set in the initiator mode, the close proximity wireless transfer device 20 transmits a connection request signal to the external device (block B301). The connection request signal includes the device ID of the close proximity wireless transfer device 20. The close proximity wireless transfer device 20 waits for a response signal from the external device. When the close proximity wireless transfer device 20 receives the response signal from the external device (block B302), wireless connection is established between the close proximity wireless transfer device 20 and the external device.

On the other hand, if the close proximity wireless transfer device 20 has been set in the responder mode, the close proximity wireless transfer device 20 periodically executes a process of detecting a connection request signal from the external device (block B301). The connection request signal includes the device ID of the external device. When the close proximity wireless transfer device 20 receives the connection request signal from the external device, the close proximity wireless transfer device 20 transmits a response signal including the device ID of thereof to the external device (block B302).

Prior to starting data transfer, the communication control program 102a executes a negotiation process with the external device that is the target of communication, and determines content data to be transmitted. In addition, by the negotiation process, the communication control program 102a sends the notification function information indicative of the capability of the communication state notification function which is the function of notifying the communication state to the external device (block B303). Furthermore, by the negotiation process, the communication control program 102a receives the notification function information indicative of the capability of the communication state notification function of the external device from the external device (block B304).

Using the received notification function information of the external device, the communication control program 102a determines whether the external device has an audio output function or not (block B305).

If the external device has the audio output function (YES in block B305), the communication control program 102a determines whether the electronic apparatus 10 has an audio output function or not (block B306). If the electronic apparatus 10 has the audio output function (YES in block B306), the communication control program 102a determines whether the audio output function of the external device has a higher function level than the audio output function of the electronic apparatus 10, by using the received notification function information of the external device (block B307). If the audio output function of the external device has a higher function level than the audio output function of the electronic apparatus 10 (YES in block B307), the communication control program 102a suppresses the audio output function of the electronic apparatus 10 (block B308). Then, the communication control program 102a issues a request for sound output to the external device (block B309). The signal requesting audio output is sent from the close proximity wireless transfer device 20 to the external device.

The external device, which has received the request for sound output from the electronic apparatus 10 (communication control program 102a), reproduces the start sound indicative of the start time of data transfer (block B310). Then, the communication control program 102a transmits the content data determined by the negotiation process (block B311). When the transfer of content data is completed, the external device reproduces an end sound indicative of the end time of data transfer (block B312).

If the external device has the audio output function (YES in block B305) and the electronic apparatus 10 does not have the audio output function (NO in block B306), the process from block B309 to block B312 is similarly executed.

If the external device does not have the audio output function (NO in block B305), the communication control program 102a determines whether the electronic apparatus 10 has the audio output function or not (block B313). If the electronic apparatus 10 has the audio output function (YES in block B313), the communication control program 102a reproduces a start sound indicative of the start time of data transfer, by using the audio output function of the electronic apparatus 10 (block B315). The communication control program 102a transmits the content data determined by the negotiation process (block B316). When the transfer of content data is completed, the communication control program 102a outputs an end sound indicative of the end time of data transfer (block B317).

If each of the external device and the electronic apparatus 10 has the audio output function (YES in block B305 and YES in block B306) and the audio output function of the external device does not have a higher function level than the audio output function of the electronic apparatus 10 (NO in block B307), the communication control program 102a issues a request for suppressing the audio output function to the external device (block B314). A signal requesting the suppression of the audio output function is sent from the close proximity wireless transfer device 20 to the external device. Then, the above-described process from block B315 to block B317 is executed.

If neither the external device nor the electronic apparatus 10 has the audio output function (NO in block B305 and NO in block B313), the communication control program 102a transmits the content data determined by the negotiation process, without notifying the communication state by sound (block B318).

By the above-described process, the electronic apparatus 10 compares the presence/absence and capability of the audio output function of the electronic apparatus 10 and the presence/absence and capability of the audio output function of the external device, thereby executing control to notify the communication state by that one of the electronic apparatus 10 and the external device, which has the communication state notification function or has the communication state notification function of a higher function level. In the above-described flowchart, mention has been made of only the notification by sound output from the speaker 17. However, the above-described control can be applied to the optical output function of notify the communication state by lighting or flickering of the LED of the indicator 18. If the external device has a communication state notification function such as an audio output function, the communication state notification function of the external device may preferentially be used, regardless of the capability of this communication state notification function.

As has been described above, according to the present embodiment, the function of notifying the communication state in the close proximity wireless transfer can be adjusted between the two devices, and it is possible to prevent the two devices, which execute the close proximity wireless transfer, from overlappingly executing the communication state notification functions. When the electronic apparatus 10 of the present embodiment and the external device are connected, the electronic apparatus 10 controls the electronic apparatus 10 or issues a request to the external device, so that the communication state may be notified by that one of the electronic apparatus 10 and external device, which has the communication state notification function, or that one of the electronic apparatus 10 and external device, which has the communication state notification function of a higher function level. Thus, even if each of the connected devices (the electronic apparatus 10 and external device) has the communication state notification function, the communication state is properly notified to the user, without collision of outputs of sound or light for communication state notification. For example, sound is reproduced by one of the communication state notification function of the electronic apparatus 10 and the communication state notification function of the external device, and thereby it becomes possible to avoid such a situation that sounds are reproduced as cacophony from both devices at the same time and the cacophony causes unpleasant feeling to the user. Furthermore, since sound or light is output from one device alone, the power consumption in the other device, in which the output of sound or light is suppressed, can be reduced.

In the present embodiment, the electronic apparatus 10 has been described, by way of example, as being realized as the personal computer functioning as a station. Alternatively, the electronic apparatus 10 may be realized as a portable device such as a mobile phone or a PDA.

The respective components shown in FIG. 2, which have been described as software modules in the present embodiment, may also be realized as hardware modules.

The various modules of the systems described herein can be implemented as software applications, hardware and/or software modules, or components on one or more computers, such as servers. While the various modules are illustrated separately, they may share some or all of the same underlying logic or code.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An electronic apparatus comprising:
   a communication module configured to execute close proximity wireless transfer;
   a communication state notification module configured to notify at least one of a start time and an end time of data transfer executed between the communication module and an external device, the data transfer being executed by the close proximity wireless transfer;
   a notification function information receiver configured to receive notification function information indicative of a capability relating to a communication state notification function of the external device from the external device; and
   a notification function controller configured to request the external device to execute or suppress the communication state notification function by the external device, based on the received notification function information.

2. The electronic apparatus of claim 1, wherein the notification function information receiver is configured to receive the notification function information from the external device by a negotiation between the communication module and the external device.

3. The electronic apparatus of claim 1, wherein the notification function controller is configured to request the external device to execute or suppress the communication state notification function by the external device, based on a communication state notification function of the communication state notification module and the communication state notification function of the external device indicated by the received notification function information, and to suppress execution of the communication state notification function by the communication state notification module if the notification function controller requests the external device to execute the communication state notification function by the external device.

4. A communication state notification function control method of controlling a function of notifying at least one of a start time and an end time of data transfer executed between a communication module provided in an electronic apparatus and an external device, the data transfer being executed by close proximity wireless transfer, the method comprising:
   receiving notification function information indicative of a capability relating to a communication state notification function of the external device from the external device; and
   transmitting a signal requesting execution or suppression of the communication state notification function by the external device from the communication module to the external device, based on the received notification function information.

5. The communication state notification function control method of claim 4, further comprising notifying at least one of a start time and an end time of the data transfer by a communication state notification function provided in the electronic apparatus when data is transmitted between the communication module and the external device, if the signal requesting the suppression of the communication state notification function by the external device is sent to the external device.

6. The communication state notification function control method of claim 4, wherein the receiving comprises receiving the notification function information from the external device by a negotiation between the communication module and the external device.

7. The communication state notification function control method of claim 4, wherein the transmitting comprises:
   comparing a communication state notification function of the electronic apparatus and the communication state notification function of the external device indicated by the received notification function information;
   transmitting from the communication module to the external device the signal requesting execution or suppression of the communication state notification function by the external device, based on a result of the comparing; and
   executing the communication state notification function if the signal requesting the suppression of execution of the communication state notification function by the external device is sent to the external device.

\* \* \* \* \*